United States Patent [19]
Ivanov et al.

[11] Patent Number: 5,359,934
[45] Date of Patent: Nov. 1, 1994

[54] DIRECTIONAL WARHEAD FUZE

[75] Inventors: Alex J. Ivanov, Chelmsford; James A. Driscoll, Haverhill, both of Mass.; Richard P. Linnehan, Litchfield, N.H.; Malcolm F. Crawford, Lexington, Mass.; A. Robert Chinchillo, North Reading, Mass.; Ernest Goldberg, Westford, Mass.

[73] Assignee: Raytheon Company, Lexington, Mass.

[21] Appl. No.: 584,681

[22] Filed: Sep. 19, 1990

[51] Int. Cl.⁵ ............................................. F42C 13/04
[52] U.S. Cl. ................................................ 102/214
[58] Field of Search ........................ 102/214, 215, 213

[56] References Cited
U.S. PATENT DOCUMENTS 3,661,088  5/1972  Harr et al. ............................. 102/215
3,913,485  10/1975  Holmes et al. ....................... 102/214

FOREIGN PATENT DOCUMENTS 2388468  12/1978  France ................................ 102/214

Primary Examiner—Charles T. Jordan
Attorney, Agent, or Firm—Donald F. Mofford

[57] ABSTRACT

A directional ordnance for a missile. The missile contains circuitry to determine the direction of a target relative to the missile and to selectively detonate directing charges to force the blast from the warhead towards the target. The circuitry for determining the direction of the target includes two transmit antennas, each transmitting a different pseudo noise sequence, and two receive antennas; each coupled to a receiver which can determine the level of each pseudo noise sequence at each receive antenna. The relative strengths of the different pseudo noise sequences tell the direction of the target relative to the transmit and receive antennas.

21 Claims, 5 Drawing Sheets

5,359,934

DIRECTIONAL WARHEAD FUZE

This invention was made with Government support under Contract No. F08635-88-C-0188, awarded by the Department of the Air Force. The Government has certain rights in this invention.

BACKGROUND OF THE INVENTION

This application relates generally to guided missiles and more particularly to improving the effectiveness of missiles fired at airborne targets.

Guided missiles fired at airborne targets are well known. Certain types of such missiles contain a radar fuzing system. The fuzing system detects the presence of a target and measures the range between the missile and the target. At an appropriate range, the fuzing system detonates a warhead. The explosion of the warhead propels a cloud of shrapnel in all directions relative to the missile. If enough of the shrapnel strikes the target at a vulnerable area, the target is destroyed.

The fuzing system of one existing missile comprises two transmit antennas and two receive antennas. Each transmit antenna radiates a radar signal modulated with a pseudo noise (hereafter PN) sequence into a roughly 180° sector relative to the missile. Each receive antenna receives radar reflections from a 180° sector. Both transmit antennas are fed the same signal. Likewise, both received signals are combined. Thus, the four antennas provide 360° coverage to both transmit and receive signals.

The received signal is mixed with several copies of the PN sequence, each delayed by a different time. Mathematically, this mixing correlates the received signal with the transmitted signal. The time delay associated with the delayed copy of the PN signal which produces the highest correlation indicates the back and forth propagation time to the target and, hence, indicates the range to the target. The measured range indicates when the fuzing system should detonate the warhead.

To avoid detonating the warhead when no target is present, the warhead is not detonated unless the highest correlation signal exceeds a threshold. The threshold is determined by correlating the PN signal with the background noise signal present when a reflected radar signal is not being received. This threshold signal gives a measure of the background noise level. Accordingly, the warhead is not detonated unless the highest correlation signal is above the noise.

While this arrangement for detonating a warhead is adequate for some applications, it is desirable to improve the effectiveness of the missile for other applications.

One way to improve the effectiveness of a missile is to direct the energy from the detonation of the warhead towards the target. Directional warheads are known that contain directing charges. In some systems, called mass focus systems, the directing charge deforms the shell of the missile. When the main explosive charge of the warhead explodes, the shrapnel tends to be focused towards the deformed region. In other systems, called velocity focus systems, a directing charge is detonated and creates a shock wave in a particular direction. The explosion of the main explosive charge while the shock wave is present causes shrapnel in the direction of the shock wave to have a greater velocity.

Regardless of which type of directional warhead is used, it is necessary for the fuze detonating the warhead to determine the direction of the target relative to the missile. Additionally, it would be desirable to create a directional warhead system with as little change as possible to an existing fuzing system.

SUMMARY OF THE INVENTION

With the foregoing background in mind, it is an object of this invention to provide a means for improving the effectiveness of a missile by increasing the amount of energy directed towards the target.

It is also an object of this invention to provide a method of improving the effectiveness of a missile while minimizing changes to existing missile designs.

The foregoing and other objects are achieved by incorporating four subcharges in the missile warhead. Appropriate ones of the subcharges are detonated within the warhead and the blast from the subcharges directs shrapnel of increased velocity in the desired direction. The desired direction is determined by transmitting, from two transmit antennas, two different PN sequences. The signals received at each of two receive antennas are correlated with the two different sequences, thus producing four correlated signals. The relative amplitudes of the maximum values of the correlated signals indicates the direction in which the increased velocity, and hence increased energy, shrapnel is to be directed.

BRIEF DESCRIPTION OF THE DRAWINGS

The invention will be better understood by reference to the following more detailed description and accompanying figures in which.

DESCRIPTION OF THE PREFERRED EMBODIMENT

Figure 1:
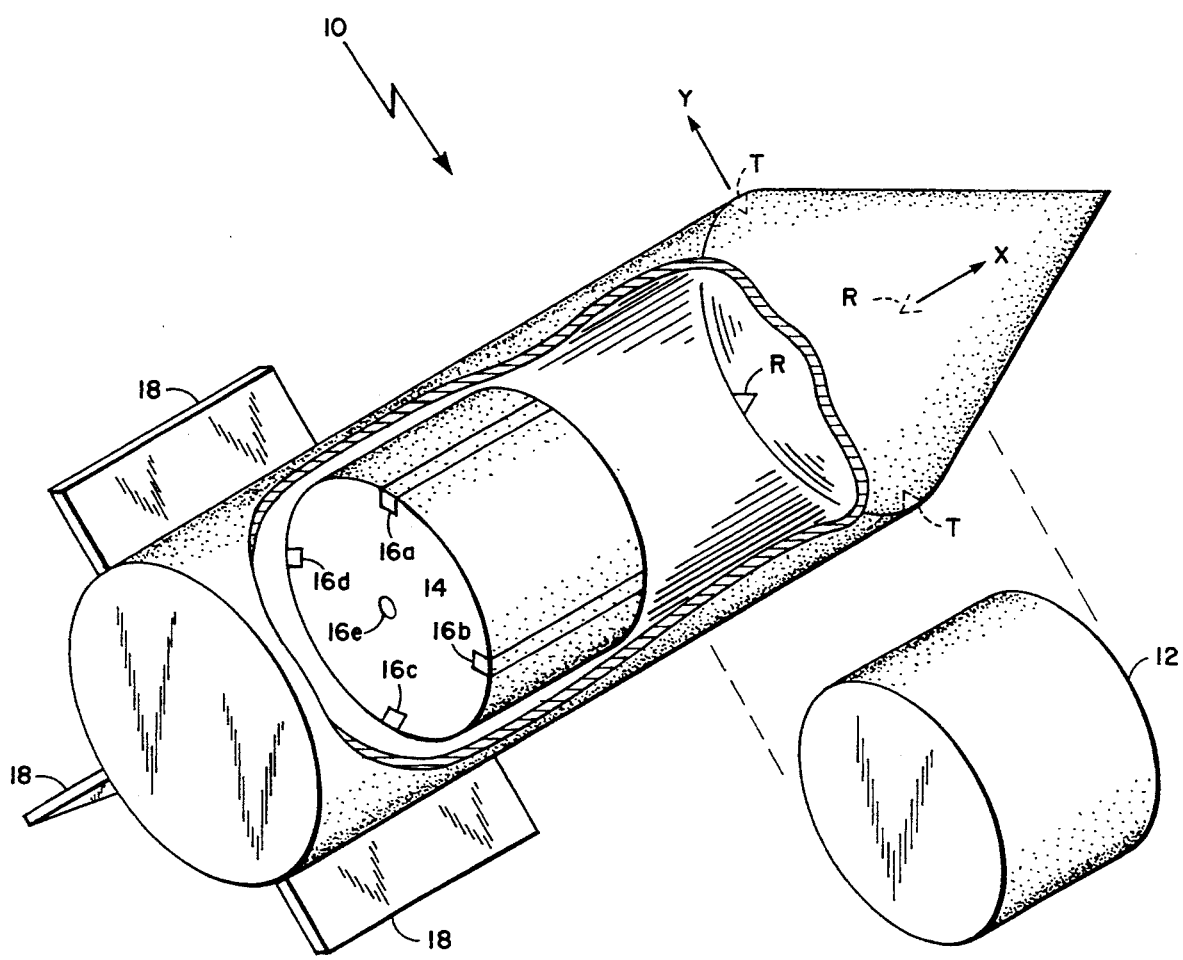
FIG. 1 is a simplified sketch, with a cutaway portion, of a missile incorporating the invention.

FIG. 1 shows a missile 10 fabricated according to the invention. Missile 10 is fabricated using known techniques.

As shown, missile 10 has an electronics section 12 which contains electronic circuits to control missile 10. These circuits are fabricated using known techniques. For example, electronics section 12 contains circuitry which generates signals to control fins 18 to steer missile 10. Electronics section 12 also contains circuitry which detonates main explosive charge 14. In addition, electronics section 12 also contains circuitry to simultaneously detonate one or two of the directing explosive charges 16a–16e. As will be described below, when directing charge 16e, which runs through the center of main explosive charge 14 is detonated, the blast produced by main explosive charge 14, will be isotropic. Directing charges 16a–16d can be selectively detonated to direct an increased amount of energy from the blast into one of eight sectors around missile 10.

Electronics section 12 gathers information on the location of a target (not shown) using antennas $T_1$, $R_1$, $T_2$, and $R_2$. This information allows electronics section 12 to determine which directing explosive charges to fire and when to fire the charges to direct the maximum amount of shrapnel with increased energy at the target (not shown). Antennas $T_1$ and $T_2$ transmit signals which will be described in greater detail below. Antennas $R_1$ and $R_2$ receive signals from which electronics section 12 calculates the range between missile 10 and the target (not shown) and the direction of the target relative to missile 10.

The time for firing main explosive charge 14 is determined using known techniques. Suffice it to say, the range between missile 10 and the target is measured from radar returns from the target. Electronics section 12 estimates the point of closest approach between missile 10 and the target. Main explosive charge 14 is detonated prior to the point of closest approach. The detonation of main explosive charge 14, as in conventional missiles, creates a cloud of shrapnel around missile 10.

The direction of the target relative to missile 10 is also determined in a manner described below. Electronics section 12 detonates selected one or ones of the directing explosive charges 16a . . . 16e nearly simultaneously with detonation of main explosive charge 14. The explosive force of the selected ones of directing charges forces the cloud of shrapnel created by the detonation of main explosive charge 14 to have an increased velocity toward the target (not shown). For example, simultaneous detonation of directing charges 16c and 16b directs the cloud of shrapnel in the direction labeled Y. Detonation of directing charge 16c directs the cloud of shrapnel in a direction intermediate those labeled X and Y.

Here, four directing charges 16a . . . 16d are shown. These four directing charges can be formed into eight different combinations of one or two adjacent charges. Thus, electronics section 12 can direct the cloud of shrapnel into one of eight different directions. Thus, electronics section 12 must determine into which of eight sectors around missile 10 the target is located.

Figure 2:
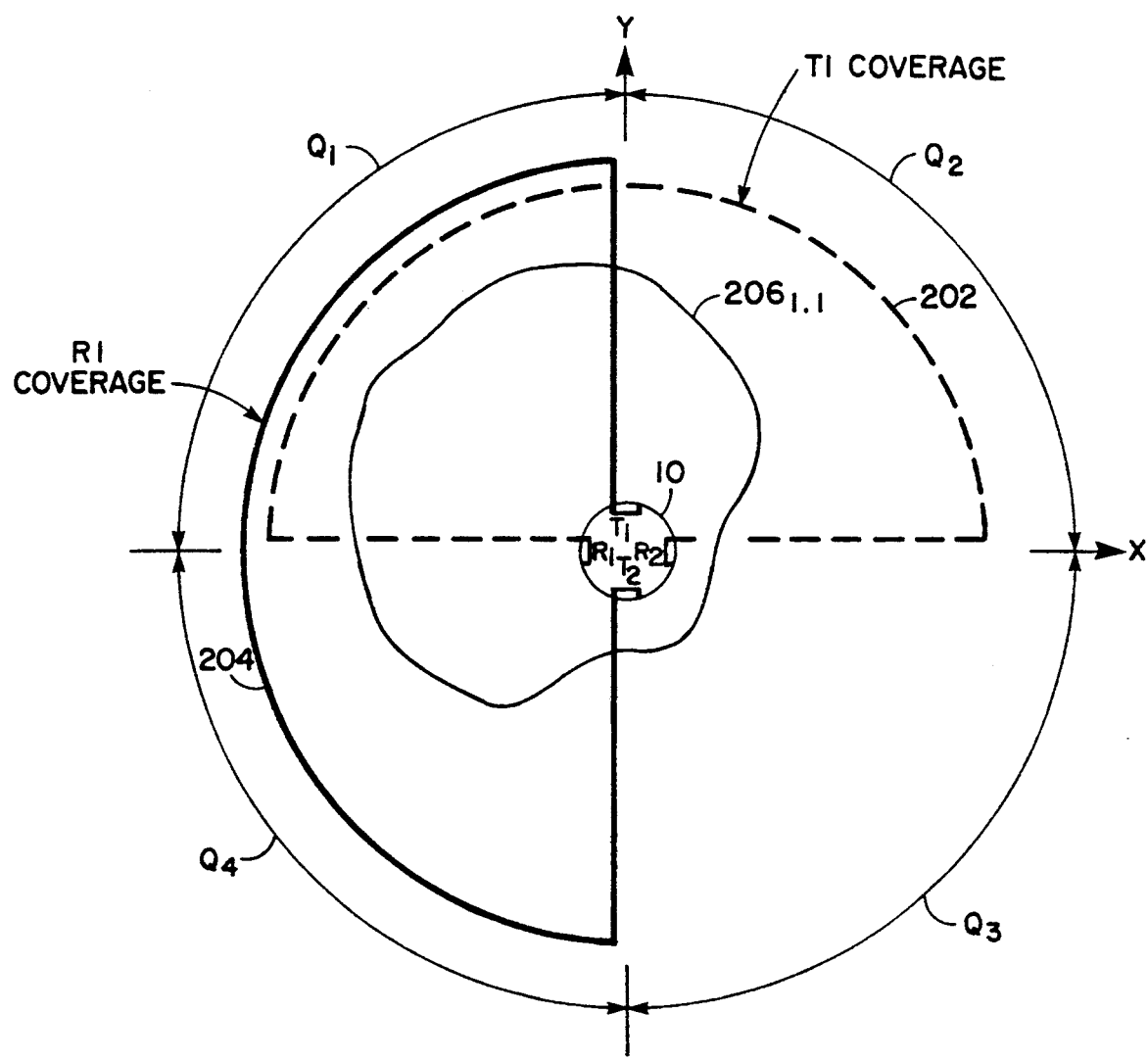
FIG. 2 is a sketch of the two-way pattern formed by a combination of one transmit and one receive antenna.
Figure 3:
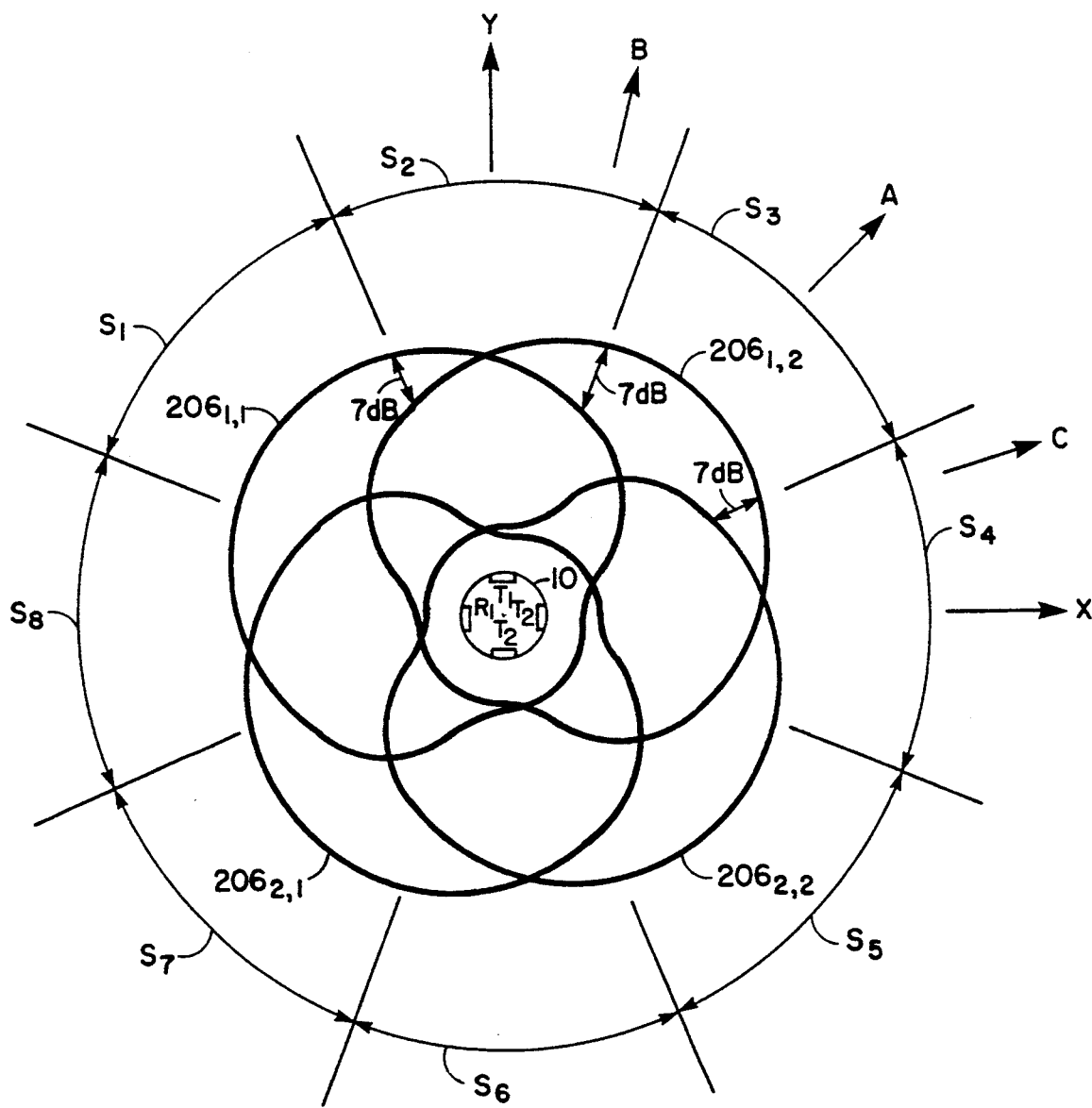
FIG. 3 is a sketch of the four, two-way patterns formed by combining one transmit and one receive antenna.

The way in which electronics section 12 determines the location of the target can be understood by reference to FIGS. 2 and 3. In FIG. 2, missile 10 is shown in cross-section in relation to the axes X and Y shown in FIG. 1.

As in conventional missiles, antennas $T_1$ and $T_2$ are connected to transmitters of conventional design (FIG. 4) which produce pseudo noise (hereafter "PN") sequences. Unlike conventional missiles, antennas $T_1$ and $T_2$ transmit different, independent PN sequences. For convenience, the PN sequences will be denoted Code 1 and Code 2.

Antennas $R_1$ and $R_2$ are connected to receivers of conventional design (FIG. 4). In a manner described in greater detail below, each received signal is correlated with both Code 1 and Code 2. As is known, a PN sequence correlated with an identical PN sequence will produce a high output at a time indicating the time delay between the PN sequences. A PN sequence correlated with a different, independent PN sequence will produce a uniformly low output. Thus, it can be determined from the signal received at antennas $R_1$ or $R_2$ whether the signal is the reflection of a signal transmitted by antenna $T_1$ or $T_2$.

Each of the antennas $T_1$, $T_2$, $R_1$, and $R_2$ has a coverage pattern of approximately 180°. As shown in FIG. 2, antenna pattern 202 roughly approximates the angular coverage pattern of transmitting antenna $T_1$ and antenna pattern 204 roughly approximates the coverage pattern of receiving antenna $R_1$. FIG. 2 shows missile 10 at the origin of a coordinate system. The distance from the origin of any point is proportional to the gain of the antenna pattern in the direction of that point.

As is known, the total antenna gain in any signal path is the product of the gain of antenna pattern of the transmit antenna and the antenna pattern of the receiving antenna. The product of antenna patterns 202 and 204 has a non-zero value in the quadrant denoted $Q_1$ and is, to a rough approximation, zero in quadrants $Q_2$ . . . $Q_4$. To a close approximation, if the code transmitted by antenna $T_1$ is received at antenna $R_1$, then the transmitted signal must have reflected from a target in quadrant $Q_1$.

Targets in quadrant $Q_2$–$Q_4$ can be detected in a similar fashion. Reception of Code 1 at antenna $R_2$ represents reflections from a target in quadrant $Q_2$. Reception of Code 2 at antenna $R_2$ represents reflections from a target in quadrant $Q_3$. Reception of Code 2 fat antenna $R_2$ represents reflections from a target in quadrant $Q_4$. Thus, it can be seen that the transmitted PN sequences (Code 1 and Code 2) can be taken in combination with the signals at the receive antennas to compute reflections from a given quadrant. The pair of a PN sequence and a receive antenna thus defines a quadrant.

The actual product of the antenna patterns from antennas $T_1$ and $R_1$ does not abruptly end at the edges of quadrant $Q_1$. Rather, two-way coverage pattern $206_{1,1}$ shows a more realistic coverage pattern produced by the combination of a signal transmitted by antenna $T_1$ and received by antenna $R_1$.

To conceptualize one simple way to operate the device, it is useful to picture the space around missile 10 as divided into four quadrants, $Q_1$, $Q_2$, $Q_3$, and $Q_4$. When a target is detected, its direction relative to missile 10 is resolved into one of the four quadrants $Q_1$ . . . $Q_4$. Selected ones of directing charges $16_a$ . . . $16_d$ could be detonated to direct the cloud of shrapnel created by main explosive charge 14 into the appropriate one of the four quadrants.

Further enhancements can be made to remove shortcomings of this simple approach. It has been found that when a target is near the edge of a quadrant, directing the cloud of shrapnel into the center of the quadrant does not provide the desired efficacy. Accordingly, FIG. 3 shows the area around missile 10 divided into eight sectors $S_1$ . . . $S_8$. As described above, the cloud of shrapnel created by the detonation of main explosive charge 14 can be directed into the center of any of these sectors by detonating one or two of the directing charges 16a . . . 16d. Thus, electronics section 12 (FIG. 1) contains circuitry to process the signals at antennas $R_1$ and $R_2$ to determine in which of the eight sectors the target is.

FIG. 3 shows the two-way coverage patterns $206_{1,1}$, $206_{1,2}$, $206_{2,2}$, and $206_{2,1}$ created by the various combinations of transmit and receive antennas. Two-way coverage pattern $206_{1,1}$ is the pattern created by receiving a signal transmitted by antenna $T_1$ at antenna $R_1$. Two-way coverage pattern $206_{1,2}$ is the pattern created by receiving a signal transmitted by antenna $T_1$ at antenna $R_2$. Two-way coverage pattern $206_{2,2}$ is the pattern created by receiving a signal transmitted by antenna $T_2$ at antenna $R_2$. Two-way coverage pattern $206_{2,1}$ is the pattern created by receiving a signal transmitted by antenna $T_2$ at antenna $R_1$.

It must be recalled that antenna $T_1$ transmits only Code 1. Thus, coverage patterns $206_{1,1}$ and $206_{1,2}$ are formed by looking at the strength of the Code 1 signal at antennas $R_1$ and $R_2$, respectively. Likewise, coverage patterns $206_{2,1}$ and $206_{2,2}$ are formed by looking at the strength of the Code 2 signal at antennas $R_1$ and $R_2$, respectively.

By comparing the strengths of the two different PN sequences received at each of antenna $R_1$ and $R_2$, it can be determined whether the target (not shown) falls in a direction in which any of the coverage patterns has a gain significantly above zero.

From the directions of the coverage patterns in which the target falls, the sector in which the target falls can be determined. For example, in sector $S_3$, combined coverage pattern $206_{1,2}$ exceeds both combined coverage pattern $206_{1,1}$ and $206_{2,2}$ by a predetermined amount, here 7 dB. Thus, if the strength of the Code 1 signal at antenna $R_2$ exceeds, by 7 dB, the strength of the Code 1 signal at antenna $R_2$ and the strength of the Code 1 signal at antenna $R_1$, the target is in sector $S_1$. Directing charge 16c (FIG. 1) would then be detonated to direct the shrapnel cloud into the center of sector $S_3$.

As another example, combined coverage patterns $206_{1,1}$ and $206_{1,2}$ differ by less than 7 dB in sector $S_2$. Thus, if the Code 1 signals at antennas $R_1$ and $R_2$ differ by less than 7 dB, directing charges 16b and 16c are detonated to direct the shrapnel cloud into sector $S_2$.

Methods for comparing the amplitudes of two signals are well known. Such an arrangement might include an analog to digital converter (not shown) and a digital processor (not shown). The signals might be compared using a technique known as amplitude monopulse to accurately determine the direction of the target relative to missile 10. However, for the present invention, it is necessary to resolve the direction of the target into one of eight sectors around missile 10. Accordingly, a simpler system can be used.

Figure 4A:
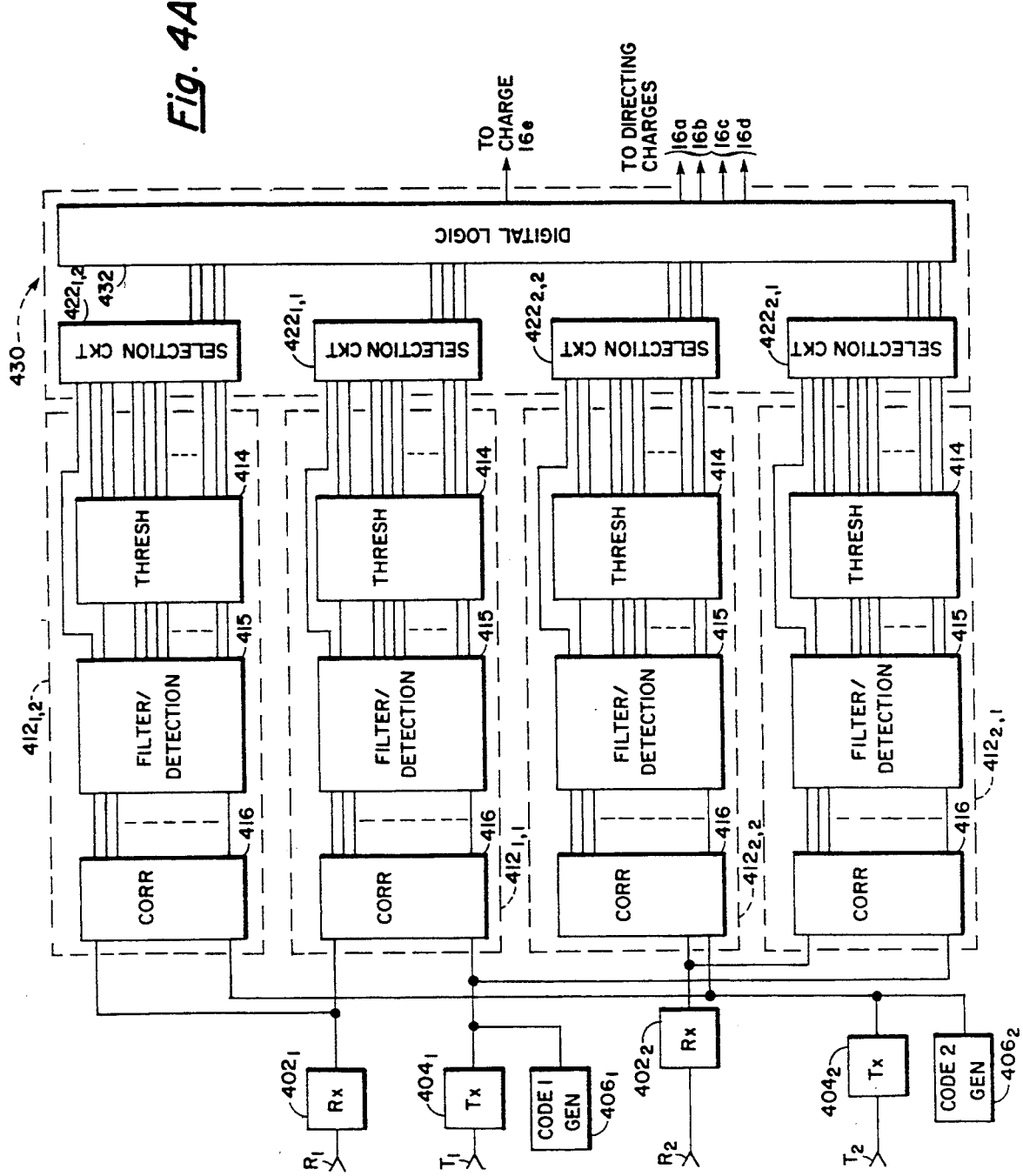
FIG. 4A is a block diagram of the signal processing electronics in the missile of FIG. 1.

FIG. 4A shows a block diagram of a simple system for determining in which of the eight sectors $S_1 \ldots S_8$ (FIG. 3) a target falls. The various elements shown in FIG. 4 are well known circuit elements, but they are configured in a novel fashion.

FIG. 4A shows code generators $406_1$ and $406_2$. These elements generate Code 1 and Code 2 PN sequences, respectively. Code 1 is passed through transmitter $404_1$ to antenna $T_1$, where it is transmitted. Code 2 is passed through transmitter $404_2$ to antenna $T_2$. As is known, transmitters $404_1$ and $404_2$ amplify and up convert the code signals or modulate a carrier with the code signals.

Portions of the transmitted signals reflected from the target are received at antennas $R_1$ and $R_2$. The received signals are passed through receivers $402_1$ and $402_2$ to analog processors $412_{1,1}$, $412_{1,2}$, $412_{2,1}$, and $412_{2,2}$.

Figure 4B:
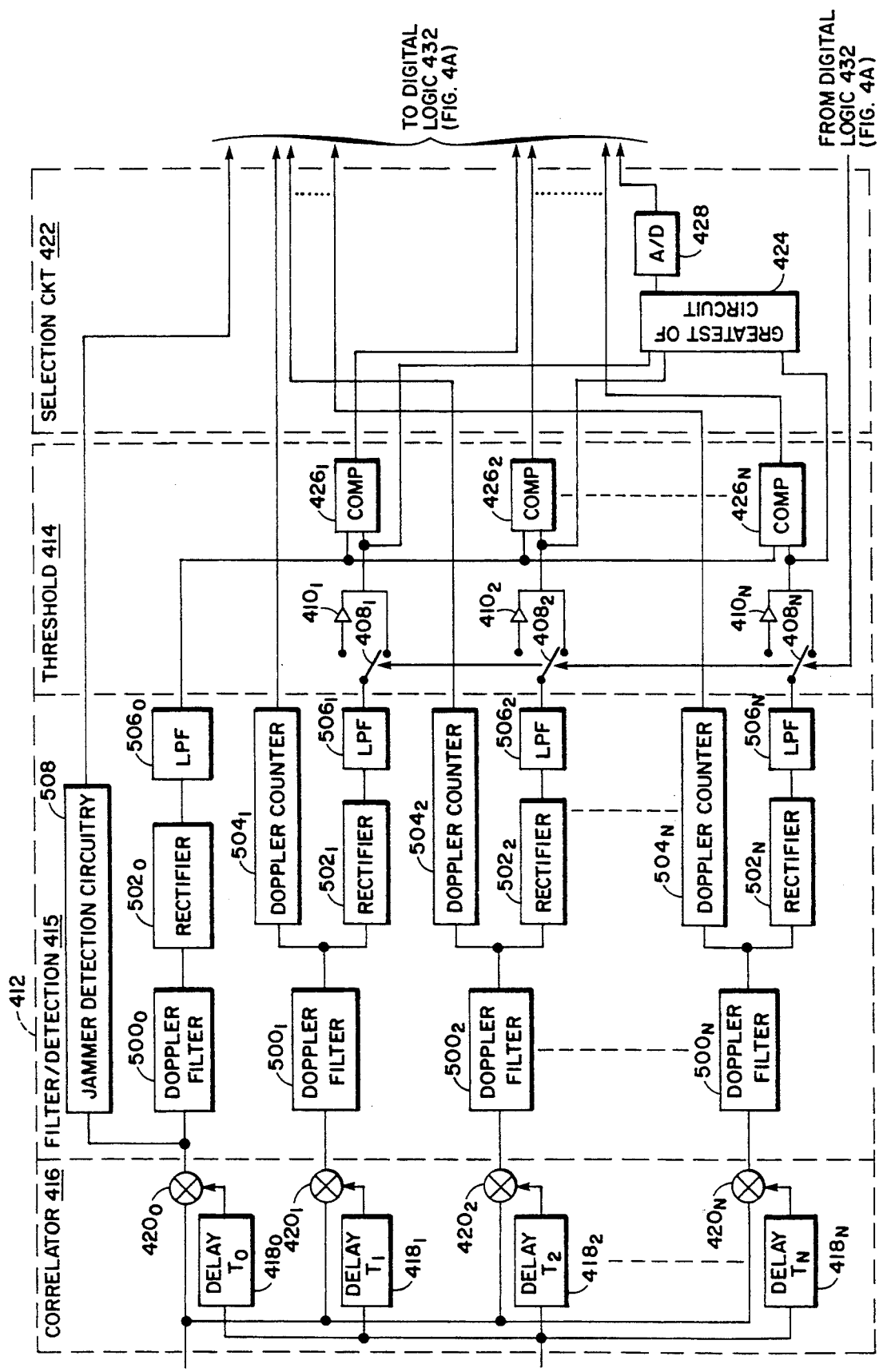
FIG. 4B is a block diagram showing additional details of the analog processors in the circuit of FIG. 4A.

Each of analog processors $412_{1,1}$, $412_{1,2}$, $412_{2,1}$, and $412_{2,2}$ contains identical circuitry, shown in greater detail in FIG. 4B. Each analog processor has two inputs. One input is connected to either code generator $406_1$ or $406_2$. The second input is connected to either receiver $402_1$ or $402_2$. In this way, each of the four pairs of signals that can be formed by selecting one of the two code signals and one of the two received signals is fed to one of the analog processors.

Taking analog processor $412_{1,1}$ as representative, it can be seen that each analog processor contains a threshold circuit 414, a filter/detection circuit 415, and a correlator 416.

Inside correlator 416, as shown in FIG. 4B, the code signal is broken into a plurality, here denoted N+1, of paths. Each path contains one of the delay elements $418_0 \ldots 418_N$. Each of the delay elements $418_0 \ldots 418_N$ has a different delay denoted $T_0 \ldots T_N$. The length of the delays starts at zero for $T_0$ and increases by the length of one bit of the PN sequence for each successive delay $T_1 \ldots T_N$. A received signal is applied to the second input of correlator 416.

The delayed code signals and the received signals are mixed at mixers $420_0 \ldots 420_N$. As is known, when two identical PN sequences are mixed, the output signal has a high average output value. When different PN sequences or when delayed versions of the same PN sequence are mixed, the output signal has a low average output value. In the system shown in FIG. 4A and FIG. 4B, it must be appreciated that the received signal can contain the transmitted code signals reflected from a target. The code signal is delayed by the time it takes for the signals to propagate back and forth from the missile 10 to the target. Thus, the signals at the receivers contain code signals delayed relative to the signals produced by code operators $406_1$ and $406_2$. However, if the delays $T_1 \ldots T_N$ are appropriately selected, the received signal will contain a code signal with the same delay as one of the outputs of one of the delay elements $T_1 \ldots T_N$. When the output of the delay element with the matching delay is mixed with the received signal at one of the mixers $420_1 \ldots 420_N$, the mixer will produce a relatively high output. The outputs of all the other mixers $420_1 \ldots 420_N$ will have lower average values.

Filter/detection circuit 415 processes the outputs of mixers $420_0 \ldots 420_N$ to compute the average value at their outputs. The output of each mixer $420_0 \ldots 420_N$ is applied to one of the Doppler filters $500_0 \ldots 500_N$. As can be computed from known signal analysis techniques, the frequency spectrum of the output of each of the mixers $420_0 \ldots 420_N$ contains the spectrum of the desired signal at a baseband frequency plus various harmonics. Doppler filters $500_0 \ldots 500_N$ pass the baseband and reject the harmonics. Rectifiers $502_0 \ldots 502_N$ and lowpass filters $506_0 \ldots 506_N$ compute the average magnitude of the output of their respective mixers $420_0 \ldots 420_N$.

Filter/detection circuit 415 also contains circuitry to perform other functions. For example, jammer detection circuitry 508 senses the level of the received signal and indicates the presence of a jammer if the signal level is too high. Doppler counters $504_1 \ldots 504_N$ measure the frequency, by counting zero crossings, of the received signals. The Doppler information thus derived gives an indication whether missile 10 is in front of or behind the target. The information produced by jammer detection circuitry 508 and Doppler counters $504_1 \ldots 504_N$ is used by processor 430 (FIG. 4A) in a conventional manner.

Selecting the one of the mixers $420_1 \ldots 420_N$ with the largest average output value might give an indication of the time it took for a signal to propagate from missile 10 to the target and back. This time can be easily translated into a range between the missile and target. Processor 430 (FIG. 4A) selects the largest signal from the outputs of mixers $420_0 \ldots 420_N$ after processing by filter/detection $415_{1,1}$ and determines range as in prior art systems.

Selecting the mixer with the largest output will produce an erroneous result if the code signal is not present in the received signal. For example, analog processor $412_{1,1}$ compares Code 1 with the signal at antenna $R_1$. If the target is not illuminated by the Code 1 signal transmitted by antenna $T_1$, or the target does not fall within the antenna pattern of antenna $R_1$, the signal at antenna $R_1$ will contain the Code 1 signal at such low levels that it can essentially be said to be a zero level. In other words, the target may not be in a direction covered by combined antenna coverage pattern $206_{1,1}$. To determine if a received signal contains the code signal at a high enough level to make the output of correlator 416 meaningful, threshold circuit 414 is employed.

Threshold circuit 414 compares the correlated received signal with a threshold signal. Since, as described previously, any signal reflected from a target is delayed relative to the code signal, mixer $420_0$ of the correlator circuit cannot be mixing a copy of the code signal with the code signal. The output of mixer $420_0$ should thus be a low level signal. This low level signal represents the correlation of the signal with background noise and is a background noise reference signal. To say that the largest output of correlator 416, after filtering by filter/detection circuitry 415, represents a signal which reflected from a target, that largest output must exceed the level of the correlation with background noise by a predetermined level. The selection of the predetermined level is based on known signal processing techniques.

Threshold circuit 414 determines which of the outputs of mixers $420_0 \ldots 420_N$ has a value so large it represents a signal reflected from a target. Switches $408_1 \ldots 408_N$ are normally switched to bypass amplifiers $410_1 \ldots 410_N$. The output of each mixer $420_1 \ldots 420_N$ is, after filtering, passed to one input of comparators $426_1 \ldots 426_N$, respectively. The second input to each comparator $426_1 \ldots 426_N$ is the background noise reference signal derived from mixer $420_0$. If the average value of any of the outputs of the mixers $420_1 \ldots 420_N$ exceeds this reference by the predetermined level, the corresponding one of the comparators $426_1 \ldots 426_N$ will be a logic HI. Otherwise, the output of the comparator will be logic LO. The outputs of comparators $426_1 \ldots 426_N$ are provided to digital logic 432 (FIG. 4A). If a signal transmitted at antenna $T_1$ is received at antenna $R_1$, the output of at least one of the comparators $426_1 \ldots 426_N$ will be a logic HI. Digital logic 432 (FIG. 4A) can then process the outputs of analog processor $412_{1,1}$ as described below. Conversely, if none of the outputs of comparators $426_1 \ldots 426_N$ is logic HI, no further processing of the outputs of analog processor $412_{1,1}$ is required.

Each of the analog processors $412_{1,1}$, $412_{1,2}$, $412_{2,1}$, and $412_{2,2}$ corresponds to one of the combined antenna patterns $206_{1,1}$, $206_{1,2}$, $206_{2,1}$, and $206_{2,2}$ in FIG. 3. Analog processor $412_{1,1}$ has as its inputs the code transmitted by antenna $T_1$ and the signal received at receiver $R_1$. Analog processor $412_{1,1}$ thus corresponds to coverage pattern $206_{1,1}$ as shown in FIG. 3. Each of the other analog processors corresponds in a like fashion to one of the remaining coverage patterns. A target within coverage pattern $206_{1,1}$ produces a signal out of correlator 416 which causes at least one of the outputs of threshold circuit 414 to be a logic HI.

As shown in FIG. 3, however, there is much overlap in the coverage patterns $206_{1,1}$, $206_{1,2}$, $206_{2,1}$, and $206_{2,2}$. Thus, the largest output of the correlator in more than one of the analog processors $412_{1,1}$, $412_{1,2}$, $412_{2,1}$, and $412_{2,2}$ may exceed the corresponding threshold. Processor 430 (FIG. 4A) receives the outputs from analog processor $412_{1,1}$, $412_{1,2}$, $412_{2,1}$, and $412_{2,2}$ via selection circuits $422_{1,1}$, $422_{1,2}$, $422_{2,1}$, and $422_{2,2}$. From these outputs, processor 430 (FIG. 4A) determines which of the sectors $S_1 \ldots S_8$ shown in FIG. 3 the target falls.

Processor 430 (FIG. 4A) contains a combination of known analog and digital processing elements to determine into which of the eight sectors the target falls into. Processor 430 contains four selection circuits $422_{1,1}$, $422_{1,2}$, $422_{2,1}$, and $422_{2,2}$. Each is connected to the outputs of a corresponding analog processor $412_{1,1}$, $412_{1,2}$, $412_{2,1}$, and $412_{2,2}$. Taking selection circuit $422_{1,1}$ as representative, it can be seen that the selection circuit contains a Greatest of Circuit 424. Greatest-of circuit 424 has as its inputs the outputs of the corresponding correlator after filtering. The output of greatest-of circuit 424 is the greatest of the inputs.

The largest value selected by greatest of circuit 424 is converted to a digital word in analog to digital converter 428. This digital word is passed to digital logic 432. All of the indications from comparators $426_1 \ldots 426_N$ and the outputs of Doppler counters $504_1 \ldots 504_N$ are also passed to digital logic 432. It should be noted that outputs of Doppler counters $504_1 \ldots 504_N$ are used to determine when the missile is at the best distance from the target to detonate explosive charge 14 (FIG. 1). These signals do not play a part in determining in which direction the energy of the blast should be focused. Also, all of the signals from comparators $426_1 \ldots 426_N$ need not be passed to digital logic 432 (FIG. 4A) unless needed for other purposes to implement a directional fuze, it is necessary only that a composite signal indicating that one of the outputs of comparators $426_1 \ldots 426_N$ is a logic HI. If one of outputs is HI, the output of greatest-of circuit 424 is deemed to be a signal reflected from a target rather than merely background noise.

All four selection circuits $422_{1,1}$, $422_{1,2}$, $422_{2,1}$, and $422_{2,2}$ provide to digital logic 432 (FIG. 4A) a digital word representing the level of the largest signal selected and a signal indicating whether that signal exceeds the threshold indicating background noise level. Digital logic 432 only considers those digital words where the corresponding signal exceeds a threshold as indicated by the outputs of comparators $426_1 \ldots 426_N$. From the digital words, digital logic 432 selects the largest digital word.

The largest digital word gives a coarse estimate of the direction of the target relative to missile 10. For example, if the largest digital word is produced by selection circuit $422_{1,2}$, then the target is in a direction in which coverage pattern $206_{1,2}$ exceeds the other coverage patterns $206_{1,1}$, $206_{2,1}$, and $206_{2,2}$. This condition is satisfied in all of sector $S_3$ (FIG. 3) and parts of the adjoining sectors $S_2$ and $S_4$ (FIG. 3).

To choose between the three possible sectors, digital logic 432 (FIG. 4A) performs further processing. Digital logic 432 produces a control signal which changes the state of the switches $408_1 \ldots 408_N$. When a switch is closed, the signal at the input of the switch is coupled to one of the amplifiers $410_1 \ldots 410_N$. These amplifiers are identical amplifiers which provide a gain of 7 dB. The selection of a gain of 7 dB can be understood by reference to FIG. 3. 7 dB is the difference in gain in adjacent ones of the coverage patterns $206_{1,1}$, $206_{1,2}$, $206_{2,1}$, and $206_{2,2}$ at the boundaries between the sectors $S_1 \ldots S_8$.

As described above, when the selection circuit associated with coverage pattern $206_{1,2}$ produces the largest digital word, the target could be in the direction A, B, or C indicated in FIG. 3. When switches $408_1 \ldots 408_N$ are activated, the received signal associated with coverage pattern $206_{1,1}$ will be amplified 7 dB relative to the other coverage patterns. This amplification has the effect of increasing coverage pattern $206_{1,1}$ by 7 dB. Thus, at the boundary between sectors $S_2$ and $S_3$ (FIG. 3), where coverage pattern $206_{1,1}$ had previously been 7 dB less than coverage pattern $206_{1,2}$, coverage pattern $206_{1,1}$ will have the same amplitude as coverage pattern $206_{1,2}$, In all of sector $S_2$, coverage pattern $206_{1,1}$ will have an amplitude greater than coverage pattern $206_{1,2}$. In sector $S_3$, coverage pattern $206_{1,2}$ will continue to have an amplitude greater than coverage pattern $206_{1,1}$.

Thus, if after switches $408_1 \ldots 408_N$ are actuated to include amplifier $410_1 \ldots 410_N$ in the signal path, the largest detected signal is associated with coverage pattern $206_{1,1}$ (i.e. the digital word from selection circuit $422_{1,1}$), then the target is in sector $S_2$. Likewise, if switching the amplifiers in analog processor $412_{2,2}$ into the signal path causes the largest signal to be associated with coverage pattern $206_{2,2}$, then the target is in sector $S_4$.

The same technique is applied regardless of in which of the four coverage patterns the largest signal falls. In this way, the direction of the target relative to the missile can be assigned to one of eight sectors.

Based on the sector in which the target falls, digital logic 432 selects appropriate ones of directing charges to detonate. As described above, the directing charges can direct a cloud of shrapnel or increase the velocity of the shrapnel in a direction centered in one of the eight sectors $S_1 \ldots S_8$. As in a conventional missile, digital logic 432 (FIG. 4A) also computes the time to detonate the selected directing charges and main charge 14.

It should be noted that missile 10 includes a directing charge 16e (FIG. 1) that can create an omni-directional detonation of main explosive charge 14. In some instances, such as when the missile is too close to the target or when digital logic 432 (FIG. 4A) cannot compute the direction of the target with certainty, directing charge 16e can be detonated in place of one of the directing charges $16_a \ldots 16_d$.

Having described one embodiment of the invention, various alternative embodiments can be constructed. For illustration, FIG. 4 showed some functions performed with analog hardware and some functions performed with digital hardware. One of skill in the art knows that most functions can be performed with either analog or digital hardware. Also, what is shown as digital logic could be readily implemented as a software program running on a microprocessor. Also, the preferred embodiment described a velocity focus warhead, but the invention could work with any type of directional warhead.

It is felt, therefore, that this invention should be limited only by the spirit and scope of the appended claims.

What is claimed is:

1. A missile comprising:
    a) a first transmit antenna and a second transmit antenna;
    b) means, coupled to the first-and second transmit antennas, for generating a first pseudo noise signal and a second pseudo noise signal;
    c) a first receive antenna and a second receive antenna; and
    d) means, coupled to the first and second receive antennas, for determining the levels of the first and second pseudo noise signals received at the first and second receive antennas.

2. The missile of claim 1 wherein the means for determining the levels of the pseudo noise signals comprises means for correlating the signals at the first and second receive antennas with the first and second pseudo noise sequences.

3. The missile of claim 1 additionally comprising means, responsive to the means for determining, for computing the direction of a target relative to the missile.

4. The missile of claim 3 additionally comprising means, coupled to the means for computing the direction of a target, for selectively firing at least one of a plurality of directing charges.

5. The missile of claim 4 wherein the means for computing direction comprises means for amplifying the signals received at the first and second receive antennas by a predetermined amount before the signals are applied to the means for computing direction.

6. The missile of claim 2 wherein the means for correlating comprises four correlators, each correlator having two inputs and one output wherein:
    a) a first correlator has one input coupled to the means for generating the first pseudo noise sequence and one input coupled to the first receive antenna;
    b) the second correlator has one input coupled to the means for generating the first pseudo noise sequence and one input coupled to the second receive antenna;
    c) the third correlator has one input coupled to the means for generating the second pseudo noise sequence and one input coupled to the first receive antenna; and
    d) the fourth correlator has one input coupled to the means for generating the second pseudo noise sequence and one input coupled to the second receive antenna.

7. The missile of claim 6 wherein the outputs of each of the four correlators is coupled to digital logic means for selecting the largest signal.

8. The missile of claim 7 wherein the output of each correlator is coupled to the digital logic means through a circuit comprising:
    a) a switch having at least one pole and two throws, the pole being connected to a correlator and the first throw coupled to an input of the digital logic means; and
    b) an amplifier having an input connected to the second throw and an output coupled to an input of the digital logic means.

9. The missile of claim 8 wherein the digital logic means also comprises means for selectively actuating the switches and for determining the direction of a target from the largest signal selected before and after the switches are actuated.

10. A method of controlling a missile comprising the steps of:
    a) transmitting at least a first pseudo noise signal into a first region and transmitting a second pseudo noise signal into a second region;
    b) receiving signals from at least a third region and from a fourth region;
    c) comparing the pseudo noise sequences and the received signals to determine the strengths of each pseudo noise signal in each received signal; and d) determining the direction of a target relative to the missile from the strength of each pseudo noise sequence in each received signal.

11. The method of controlling a missile of claim 10 wherein the step of determining the direction of a target comprises:
   a) producing a plurality of signals, each signal indicating the level of one transmitted pseudo noise signal in one received signal; and
   b) comparing the levels of the plurality of signals.

12. The method of controlling a missile of claim 11 wherein the step of determining the direction additionally comprises: assigning a direction based on the difference between the one of the plurality of signals and a second one of the plurality of signals.

13. The method of controlling a missile of claim 12 wherein the step of assigning a direction comprises:
   a) assigning a first direction when the difference between the largest of the plurality of signals anti the next largest of the plurality of signals exceeds a threshold; and
   b) assigning a second direction when the difference between the largest of the plurality of signals and the next largest of the plurality of signals is below the threshold.

14. The method of controlling a missile of claim 13 additionally comprising the step of: directing the force from an explosion in the assigned direction.

15. The method of controlling a missile of claim 11 wherein the step of producing a plurality of signals comprises: correlating each transmitted pseudo noise signal with each received signal.

16. The method of controlling a missile of claim 10 additionally comprising the step of directing a cloud of shrapnel in the direction of the target.

17. A method of controlling a missile comprising:
   a) transmitting at least:
      (i) a first transmit signal into a first transmit region around the missile, the first transmit signal being transmitted in different direction in the first transmit region with different gains, the pattern of gains making a first transmit coverage pattern;
      (ii) a second transmit signal into a second transmit region around the missile, the second transmit signal being transmitted in different direction in the second transmit region with different gains, the pattern of gains making a second transmit coverage pattern;
   b) receiving at least:
      (i) a first receive signal from a first receive region around the missile, the first receive signal being received from different directions in the first receive region with different gains, the pattern of gains making a first receive coverage pattern;
      (ii) a second receive signal from a second receive region around the missile, the second receive region being received from different directions in the second receive region with different gains, the pattern of gains making a second receive coverage pattern;
   c) determining, by processing the transmitted and received signals, the strengths of signals reflected from objects in at least four combined regions, each combined region having a combined coverage pattern with a gain in different directions given by the product of the gain of one transmit coverage pattern and one receive coverage pattern and each reflected signal having a strength proportional to the gain of the combined coverage in the direction of the object relative to the missile; and
   d) computing the direction of the object relative to the missile from the determined strength of the reflected signals.

18. The method of claim 17 additionally comprising the step of detonating an explosive charge and directing the blast from the target in the direction of the object.

19. The method of claim 18 wherein the step of determining the strength of reflected signals comprises, for each combined region:
   a) computing the correlation of one transmitted signal with one received signal; and
   b) selecting the peak value of the computed correlation.

20. The method of claim 19 wherein the step of computing the direction comprises:
   a) selecting, from the reflected signals from at least four combined regions, the strength of the reflected signal with the largest value and determining the strength of reflected signals from combined regions adjacent to the combined region from which the largest signal was reflected;
   b) selecting, as the computed direction,
      (i) the direction in the center of the combined region associated with the largest reflected signal when the strength of the largest reflected signal exceeds the strength of the reflected signals from adjacent combined regions by a predetermined treshold; and
      (ii) the direction intermediate the center of the combined region associated with the largest reflected signal and the center of the combined region associated with the larger of the reflected signals from adjacent combined regions when the strength of the largest reflected signal does not exceed the strength of the reflected signals from adjacent combined regions by a predetermined threshold.

21. The method of claim 20 wherein the step of selecting the direction comprises amplifying reflected signals from adjacent combined regions by the predetermined threshold.

* * * * *